United States Patent [19]

Kurtz et al.

[11] 4,406,992

[45] Sep. 27, 1983

[54] SEMICONDUCTOR PRESSURE TRANSDUCER OR OTHER PRODUCT EMPLOYING LAYERS OF SINGLE CRYSTAL SILICON

[75] Inventors: Anthony D. Kurtz, Englewood; Timothy A. Nunn, Ridgewood; Joseph R. Mallon, Franklin Lakes, all of N.J.

[73] Assignee: Kulite Semiconductor Products, Inc., Ridgefield, N.J.

[21] Appl. No.: 255,461

[22] Filed: Apr. 20, 1981

[51] Int. Cl.³ .............................................. G01L 1/22
[52] U.S. Cl. ...................................................... 338/2
[58] Field of Search ..................... 338/2, 4, 5; 357/26, 357/55

[56] References Cited

U.S. PATENT DOCUMENTS

| 4,023,562 | 5/1977 | Hynecek et al. | 338/4 X |
| 4,188,258 | 2/1980 | Mounteer et al. | 357/26 X |
| 4,202,217 | 5/1980 | Kurtz et al. | 338/4 X |
| 4,348,254 | 9/1982 | Lindmayer | 357/55 X |

OTHER PUBLICATIONS

M. W. Geis et al., App. Phys. Lett., "Crystallographic Orientation of Silicon on an Amorphous Substrate Using an Artificial Surface-Relief Grating and Laser Crystallization", pp. 71–73, vol. 35, No. 1, Jul. 1, 1979.

*Primary Examiner*—C. L. Albritton
*Attorney, Agent, or Firm*—Arthur L. Plevy

[57] ABSTRACT

A monocrystalline silicon substrate has formed on a surface a grating pattern manifested by a series of parallel grooves, a layer of dielectric is thermally grown on said surface to replicate said pattern on an opposite surface of said dielectric and a layer of silicon deposited on said opposite surface of said dielectric is single crystal silicon determined by said grating. The structure formed enables the deposited single crystal layer to be selectively treated to provide at least one piezoresistive sensing element to thereby provide a transducer having both the force collector or substrate and the sensing elements of single crystal silicon and dielectrically isolated by means of said dielectric layer.

11 Claims, 4 Drawing Figures

SEMICONDUCTOR PRESSURE TRANSDUCER OR OTHER PRODUCT EMPLOYING LAYERS OF SINGLE CRYSTAL SILICON

BACKGROUND OF INVENTION

This invention relates to semiconductor transducers in general and more particularly to methods for fabricating single crystal semiconductor devices.

The prior art is replete with patents depicting strain gage sensing configurations or transducers for providing force or pressure measurements. In such transducer arrangements strain or force is measured by a pattern of one or more piezoresistive elements diffused in or secured to a diaphragm fabricated from single or polycrystal silicon. The element pattern, which may be a Wheatstone bridge configuration, provides a change in resistance according to the magnitude of an applied force, which force serves to deflect the force collector upon which the sensing elements are located. The term force collector is used in a generic sense and can include a diaphragm, a beam and so on.

In order to provide for more reliable operation at high temperatures, the prior art fabricated such devices using dielectric isolation techniques. In such configurations, a silicon wafer had fabricated on a surface a dielectric layer of silicon dioxide, a layer of epitaxial silicon was fabricated on the dielectric layer and this silicon layer was polycrystalline. The layer of polycrystalline silicon was employed as a diaphragm to support single crystal sensors which are mechano-photochemically formed from the monocrystalline wafer. For examples of such structures and methods for fabrication, reference can be had to U.S. Pat. No. 3,800,264 entitled High Temperature Transducers and Housings Including Fabrication Methods issued on Mar. 26, 1974 to A. D. Kurt and J. R. Mallon, Jr., and assigned to the assignee herein.

Other patents also form sensor arrangements in layers of polycrystalline silicon, wherein the polycrystalline silicon layer serves as a diaphragm. For example, see U.S. Pat. No. 3,858,150 entitled Polycrystalline Silicon Pressure Sensor issued on Dec. 31, 1974 to Gurtler et al.; U.S. Pat. No. 4,003,127 entitled Polycrystalline Silicon Pressure Transducer issued on Jan. 18, 1977 to Jaffe et al.

In any event, it would be extremely desirable to provide a transducer structure which affords the advantages of dielectric isolation in regard to high temperature operation and overall increased reliability, which structure eliminates polycrystalline silicon as the diaphragm components. Polycrystalline silicon does not possess the mechanical strength associated with single crystal silicon and hence, such devices are more fragile, thus limiting the environments and force levels in which the transducer configurations operate. Moreover polycrystalline does not possess the mechanical stability and freedom from hysterisis of single crystal silicon. Hysterisis is a function of slip between the crystalites of a material. Single crystal silicon is essentially hysterisis free and thus an excellent transducer force collector and sensor structure. The prior art was cognizant of this problem and there was a desire to provide a single crystal silicon substrate operating with a single crystal sensor. However, in order to do so, the prior art bonded a single crystal sensor to a single crystal diaphragm by the use of a glass bonding layer having a lower softening temperature than the insulating layer and the semiconductor and having a matching expansion coefficient. A representative structure is depicted in U.S. Pat. No. 3,922,705 entitled Dielectrically Isolated Integral Silicon Diaphragm or other Semiconductor Product issued on Nov. 25, 1975 to Yerman. The problem with such devices are apparent in that the sensor is separately bonded by means of a glass bond, whose fabrication and characteristics are extremely difficult to control, hence rendering the device extremely difficult to fabricate. Moreover such structures using a relatively thick layer of glass suffer from the limitations of glass as a transducer at elevated temperatures, nonelastic behavior and locked in mechanical stresses due to nonuniform cooling during the fabrication process.

Still other techniques attempt to eliminate silicon and provide a substrate of sapphire or spinel. Such materials act as insulators and permit high temperature operation, but are difficult to manufacture due to the extreme care necessary in matching crystal axes, while such materials as spinel and sapphire are more expensive and more difficult to work with. Additionally, spinel and sapphire are difficult to etch and thus are limited in their ability to be fabricated in the complex and very thin force collector configuration currently used in the manufacture of integrated sensor transducers. A reference depicting such transducer structures is U.S. Pat. No. 4,203,327 entitled Piezoresistive Silicon Strain Sensors and Pressure Transducers Incorporating Them issued on May 20, 1980 to Singh.

It is therefore an object of the present invention to provide an improved semiconductor structure and method for fabrication, which structure is particularly adapted for use and a transducer. The structure employs a single crystal substrate having a single crystal sensor positioned directly on an intermediate dielectric isolation layer.

BRIEF DESCRIPTION OF THE PREFERRED EMBODIMENT

A single crystal silicon substrate or diaphragm layer has a line grating formed on a surface, upon which surface a dielectric isolation layer of silicon dioxide is formed, the line grating remains on the dielectric layer and a layer of silicon is deposited, which layer is of single crystal form due to the presence of the grating structure. The method employed thus enables one to eliminate any intermediate glass bonding layer as well as eliminating polycrystalline structure. Thus, the structure and methods of this invention result in extremely reliable apparatus capable of high temperature operation while possessing improved mechanical strength, which structures as fabricated employ economical materials.

DETAILED DESCRIPTION OF THE INVENTION

Figure 1:
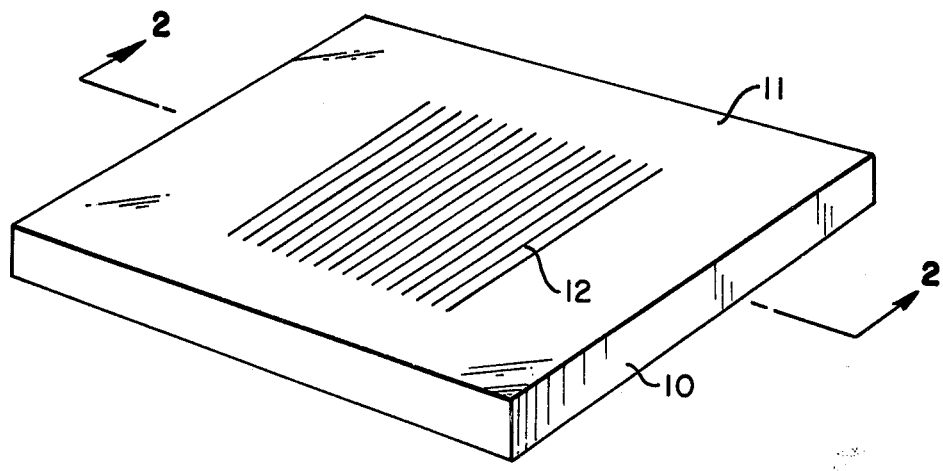
FIG. 1 is a plan view of a single crystal substrate and grating pattern according to this invention.

Referring to FIG. 1, there is shown a substrate 10 which is a single crystal silicon substrate. The substrate 10 is depicted as rectangular in shape, but a circular form or other geometric configuration could be employed as well. The substrate 10 may be fabricated from single crystal silicon and is to be employed as a diaphragm for a semiconductor transducer. The top surface 11 of the substrate 10 is relatively flat and may be polished to an optical finish to assure a relatively uniform surface.

Located on the surface 11 is a grating or pattern 12. The pattern 12 is a series of fine, closely spaced grooves which are formed on the surface of the substrate by a suitable technique. The groove pattern or grating 12 is oriented in conjunction with the original cut of the monocrystalline silicon. As is known, the substrate 10 may be cut along the (110) crystallographic plane, the (111) plane, the (100) plane, and so on. The line pattern or gradient 12 may be formed on the surface of the substrate 10 by many suitable techniques such as chemical milling, ansiotropic etching, ion milling, diamond scribing and other techniques. Masking patterns may be established by photolithography or electron or X-ray lithography. Such techniques allows one to replicate submicron resolution planar patterns on various substrates. By such techniques, patterns in various forms can be achieved with submicron precision. In this manner, each line of the pattern 12 may be approximately 0.25 microns in width with a corresponding depth. The separation between lines can be made to possess spatial periods or separation on the order of 0.5 to 3 microns. Examples of such techniques and materials employed can be had by referring to U.S. Pat. No. 4,200,345 entitled Alignment of Diffraction Gratings issued on Apr. 29, 1980 to Smith, et al. and assigned to the Massachusetts Institute of Technology. Other patents as U.S. Pat. No. 3,743,842 entitled Soft X-ray Lithographic Apparatus and Process; U.S. Pat. No. 3,742,229 entitled Soft X-ray Mask Alignment System depict other techniques employed in preparing such gratings on silicon or other substrates. A typical linear grating 12, may comprise a pattern of parallel lines each of a width and depth between 0.05 to 5 microns with a separation between lines of between 0.5 to 10 microns. Typical diaphragms may be about 1/32 of an inch in length for a rectangular diaphragm with thickness from 0.1 mils and upward. Of course diaphragm type pressure transducers are only one type of device suitable for fabrication by the techniques herein described. These techniques are suitable for the production of strain gages, force sensitive beams, integrated accelerometers and so on.

It is, of course, understood that the production of the grating 12 on the semiconductor surface 11 can be accomplished by soft X-Ray techniques or by conventional photolithography techniques, in which ultraviolet light is shone unto a photosensitive film through a mask containing the grating pattern. After exposure, the film is subjected to a developer to recreate the mask pattern on the semiconductor surface. The technique can provide line widths on the order of one micron or less and is, of course, widely employed in the manufacture and production of integrated circuits.

Figure 2:
FIG. 2 is a cross section view of the substrate of FIG. 1 taken through line 2—2.

Referring to FIG. 2, there is shown a cross section view taken through line 2—2 of FIG. 1 to show the grating pattern 12 on the surface of the substrate 10.

Figure 3:
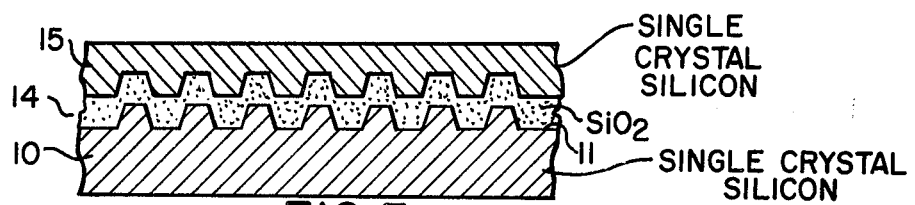
FIG. 3 is a cross sectional view of a composite semiconductor product according to this invention.

Referring to FIG. 3, it is noted that after formation of the grating 12, a thin layer of silicon dioxide 14 is thermally or otherwise grown or deposited on the surface 11 of the semiconductor 10. The layer of silicon dioxide 14 may be accomplished by thermal growth or deposition of layers of silicon dioxide and is well known in the art. Alternately other insulators such as $Al_2O_3$, $S_iN_4$, boron or phosphorous doped $S_iO_2$ and others may be employed as the insulating substrate. The layer is employed as a convenient means of electrically passivating the silicon surface and forming a protective mask against contamination of the surface by undesired impurities. Thermal oxidation normally proceeds at a temperature range of 900° to 1200° C. During oxidation, a carrier gas containing the oxidizing agent (normally oxygen gas or water vapor) is passed over the heated substrate 10. Kinetics of thermal oxide growth are well understood and it is known that for thin layers of $S_iO_2$, the growth rate is linear with time. See an article entitled "The Oxidation of Silicon in Dry Oxygen, Wet Oxygen and Steam" by B. E. Deal, J. Electromechanical Society, 110 (1963) 527. See text entitled "Physics and Technology of Semiconductor Devices" by A. S. Grove, published by Wiley, N.Y. (1967), Chapter 2.

Because the layer $S_iO_2$ is relatively thin the contoured surface of the silicon is maintained and a suitable surface for the growth of single crystal silicon is retrieved.

One now deposits a layer of silicon 15 upon the layer of silicon dioxide 10. This layer is deposited by techniques of silicon epitaxial deposition well known in the semiconductor industry. This layer can be crystallized by a thermal technique wherein bulk silicon is melted by a laser beam or suitable source and recrystallizes on the surface of the silicon dioxide. Due to the grating pattern 12, the silicon will crystallize as pure monocrystalline silicon of a nonrandom orientation. Thus, the grating pattern controls crystallization of the silicon to assure a single crystal structure. If a thicker layer is required one deposits additional silicon over the heated structure and due to the grating and thin layer of recrystallized single crystal silicon, the deposition of the free silicon atoms will exhibit continued monocrystalline growth. The grating 12 thus prevents the formation of polycrystalline silicon. The processes employed in epitaxy growth techniques can be employed to provide single crystal silicon due to the presence of the grating on the surface of the silicon dioxide layer. This technique is known as graphoepitaxy and reference is made to a paper "Crystallographic orientation of silicon on an amorphous substrate using an artificial surface relief grating and laser crystallization" by Cris Flanders and Smith published in the "Applied Physics letters" Vol. 35(1) July 1979.

Polycrystalline silicon cannot be chemcially milled by techniques of anisotropic etching and thus is limited to relatively simple structures when used as a force collector. When used as a sensor, polycrystalline silicon exhibits a decreased piezoresistive coefficient when compared to single crystal silicon and is thus inferior.

As one knows, if silicon is epitaxially grown on a noncrystalline substrate, such as $S_iO_2$, the deposited layers of silicon tend to be oriented in random directions, thus leading to a polycrystalline structure. Polycrystalline silicon does not have the electrical or mechanical properties of monocrystalline silicon and while useful in many applications such as dielectrically isolated devices, is inferior in operation.

The structure shown in FIG. 3 thus possesses a first layer or substrate 10 of single crystal silicon separated from a second single crystal silicon layer 15 by a dielectric layer 14.

Figure 4:
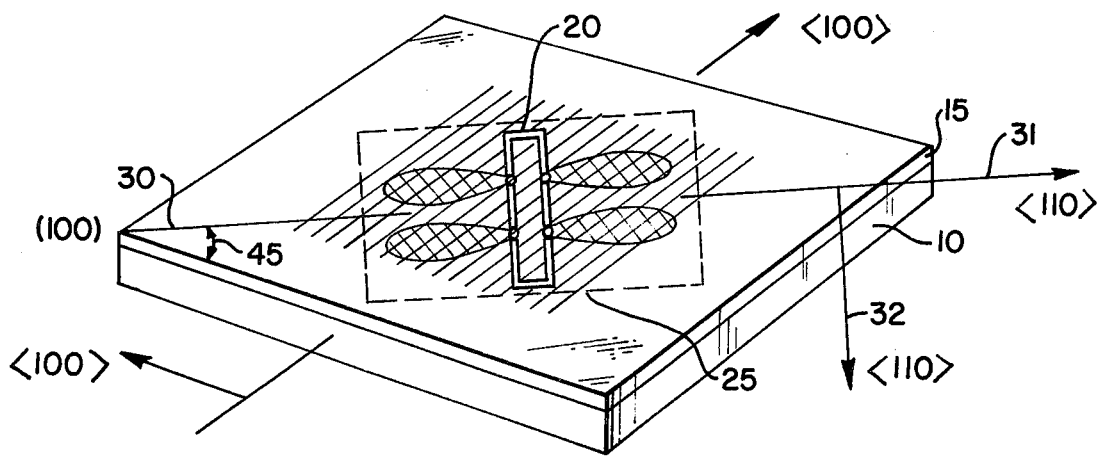
FIG. 4 is a plan view of a transducer structure according to this invention.

Referring to FIG. 4, the layer 15 can be treated by conventional semiconductor techniques to provide an array 20 of piezorosistive devices. The array 20 is provided by selectively etching the silicon layer 15 by use of an etchant such as a combination of nitric acid (HNO$_3$) and hydrofluoric acid (HF) to etch out the silicon layer 15 to form the array 20. The etchant will attack silicon dioxide relatively slowly as compared to silicon and hence, the bridge array can be easily formed by many known techniques. A contact pattern is further formed on the surface by conventional techniques, such as metal deposition and so on. To complete transducer fabrication, an aperture 25 is etched or formed on the bottom surface 26 of the wager 10 to encircle the area where the sensor array is located. This allows the final thickness of the diaphragm to be selected.

Accordingly FIG. 4 depicts a rectangular gage pattern 20 comprising a full bridge of piezoresistive sensors deposited at an angle of 45° with respect to the main axis 30. The axis 30 due to the grating pattern specifies the monocrystalline layer 15 in the (100) plane. At an angle of 45° degrees the crystal orientation axis is <110> as shown by axes 31 and 32. The bridge pattern deposited along these axes (31 & 32) gives a zero gage factor. A rectangular aperture 25 is etched or formed on the bottom surface of the wafer to define an active area where the sensor array 20 is located as above described.

The transducer structure may be secured to a suitable housing such as one fabricated from metal, glass and so on. Techniques for providing such housings and structures are well known in the art as evidenced by U.S. Pat. No. 3,654,579 entitled Electromechanical Transducers and Housings by Kurtz, et al. and assigned to the assignee herein.

The line grating pattern 12 is depicted as being particularly suitable, but other grating patterns can be employed as cross line patterns or patterns with different spacing between lines, different widths and depths. Such configurations will operate to control the recrystallization of the silicon to provide single crystal silicon on the dielectric layer replicating the grating pattern. The configuration of the grating is critical to the proper crystallization of the silicon. The method and parameters of the initial silicon deposition and the geometry of the cross-section of the grating together determine the final orientation of the crystallized silicon layer. Various geometry gratings may be employed to produce silicon layers of various orientations. The ability to control the layer orientation is extremely useful in allowing the transducer designer freedom to fabricate a device with the desired piezoresistive coefficients.

Of particular note is the ability to achieve gratings of various cross-sections through the use of known anisotropic silicon etching techniques.

There is thus provided a semiconductor product having a central dielectric layer bounded on one side by a single crystal silicon layer and on the other side by another single crystal layer. This structure is used to fabricate a transducer by selectively treating one layer to provide a piezoresistive array and terminal arrangement. The resultant transducer has dielectric isolation and hence, is capable of high temperature operation, while having all semiconductor elements fabricated from single crystal silicon.

I claim:

1. A semiconductor transducer comprising:
   a substrate layer of single crystal silicon, having a grating pattern disposed upon a surface thereof,
   an intermediate dielectric layer of silicon dioxide directly formed on a surface of said substrate layer with said dielectric layer having said grating pattern disposed upon the surface thereof, and
   at least one single crystal silicon sensor directly grown on said intermediate layer according to said grating pattern.

2. A semiconductor transducer product, comprising:
   a first bottom layer of single crystal silicon having a grating pattern disposed on a surface thereof,
   a second middle layer of a dielectric formed on a surface of said first layer and deposited on said grating pattern with a grating pattern formed on said middle layer,
   a third top layer of single crystal silicon formed on a surface of said second layer and deposited on said grating pattern manifesting a single crystal silicon piezoresistive sensor.

3. The semiconductor transducer according to claim 1 wherein said grating pattern is a series of parallel grooves forming a line grating on said surface.

4. The semiconductor product according to claim 2 wherein said dielectric layer is silicon dioxide.

5. The semiconductor product according to claim 2 wherein said grating pattern is a series of parallel grooves forming a line grating on said surface.

6. A semiconductor transducer comprising:
   a substrate layer of single crystal silicon having formed on a top surface a grating pattern,
   a dielectric layer of silicon dioxide grown on said top surface to cover the same to provide a corresponding dielectric surface having said grating pattern, and
   at least one single crystal silicon sensor directly contacting said dielectric layer within said grating location.

7. The semiconductor transducer according to claim 6 wherein said grating pattern is a series of parallel grooves forming a line grating.

8. The semiconductor transducer according to claim 7 wherein said grating is formed by a graphoepitaxy technique.

9. The semiconductor transducer according to claim 8 wherein said grating is formed by a photolithographic technique.

10. The semiconductor transducer according to claim 1 wherein said grating pattern is a sub-micron line pattern having sub-micron line widths and sub-micron spacings between lines.

11. The semiconductor transducer according to claim 7, wherein said grating pattern is a sub-micron line pattern, having groove widths of sub-micron values with the spacings between said grooves of sub-micron values.

* * * * *